United States Patent
Kumar

(10) Patent No.: US 9,158,882 B2
(45) Date of Patent: Oct. 13, 2015

(54) AUTOMATIC PIPELINING OF NOC CHANNELS TO MEET TIMING AND/OR PERFORMANCE

(71) Applicant: NETSPEED SYSTEMS, San Jose, CA (US)

(72) Inventor: Sailesh Kumar, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 0 days.

(21) Appl. No.: 14/134,079

(22) Filed: Dec. 19, 2013

(65) Prior Publication Data

US 2015/0178435 A1    Jun. 25, 2015

(51) Int. Cl.
*G06F 17/50*   (2006.01)

(52) U.S. Cl.
CPC .......... *G06F 17/5077* (2013.01); *G06F 17/505* (2013.01); *G06F 17/509* (2013.01); *G06F 2217/04* (2013.01); *G06F 2217/84* (2013.01)

(58) Field of Classification Search
CPC .. G06F 17/505; G06F 17/509; G06F 17/5077
USPC .......................... 716/138, 104, 122, 129, 130
See application file for complete search history.

(56) References Cited

U.S. PATENT DOCUMENTS

| | | | |
|---|---|---|---|
| 4,409,838 A * | 10/1983 | Schomberg | 73/602 |
| 5,432,785 A | 7/1995 | Ahmed et al. | |
| 5,764,740 A | 6/1998 | Holeander | |
| 5,991,308 A | 11/1999 | Fuhrmann et al. | |
| 6,003,029 A | 12/1999 | Agrawal et al. | |
| 6,029,220 A * | 2/2000 | Iwamura et al. | 712/32 |
| 6,249,902 B1 | 6/2001 | Igusa et al. | |
| 6,415,282 B1 | 7/2002 | Mukherjea et al. | |
| 6,925,627 B1 | 8/2005 | Longway et al. | |
| 7,065,730 B2 | 6/2006 | Alpert et al. | |
| 7,143,221 B2 * | 11/2006 | Bruce et al. | 710/113 |
| 7,318,214 B1 | 1/2008 | Prasad et al. | |
| 7,590,959 B2 | 9/2009 | Tanaka | |
| 7,725,859 B1 | 5/2010 | Lenahan et al. | |
| 7,808,968 B1 | 10/2010 | Kalmanek, Jr. et al. | |
| 7,917,885 B2 | 3/2011 | Becker | |
| 7,973,804 B2 * | 7/2011 | Mejdrich et al. | 345/614 |
| 8,020,168 B2 * | 9/2011 | Hoover et al. | 718/107 |
| 8,050,256 B1 | 11/2011 | Bao et al. | |

(Continued)

FOREIGN PATENT DOCUMENTS

CN    103684961 A    3/2014
WO   2014059024 A1  4/2014

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Phallaka Kik
(74) *Attorney, Agent, or Firm* — Procopio, Cory, Hargreaves & Savitch LLP

(57) ABSTRACT

Systems and methods for automatically generating a Network on Chip (NoC) interconnect architecture with pipeline stages are described. The present disclosure includes example implementations directed to automatically determining the number and placement of pipeline stages for each channel in the NoC. Example implementations may also adjust the buffer at one or more routers based on the pipeline stages and configure throughput for virtual channels.

14 Claims, 14 Drawing Sheets

(56) References Cited

U.S. PATENT DOCUMENTS

| | | | |
|---|---|---|---|
| 8,059,551 B2 | 11/2011 | Milliken | |
| 8,099,757 B2 | 1/2012 | Riedl et al. | |
| 8,136,071 B2 | 3/2012 | Solomon | |
| 8,261,025 B2* | 9/2012 | Mejdrich et al. | 711/147 |
| 8,281,297 B2 | 10/2012 | Dasu et al. | |
| 8,312,402 B1 | 11/2012 | Okhmatovski et al. | |
| 8,352,774 B2* | 1/2013 | Elrabaa | 713/600 |
| 8,448,102 B2 | 5/2013 | Kornachuk et al. | |
| 8,492,886 B2 | 7/2013 | Or-Bach et al. | |
| 8,514,889 B2* | 8/2013 | Jayasimha et al. | 370/474 |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,635,577 B2 | 1/2014 | Kazda et al. | |
| 8,661,455 B2* | 2/2014 | Mejdrich et al. | 719/318 |
| 8,667,439 B1 | 3/2014 | Kumar et al. | |
| 8,711,867 B2* | 4/2014 | Guo et al. | 370/397 |
| 8,717,875 B2 | 5/2014 | Bejerano et al. | |
| 8,793,644 B2* | 7/2014 | Michel et al. | 716/139 |
| 8,798,038 B2* | 8/2014 | Jayasimha et al. | 370/352 |
| 8,990,833 B2* | 3/2015 | Kuesel et al. | 719/313 |
| 2002/0071392 A1 | 6/2002 | Grover et al. | |
| 2002/0073380 A1 | 6/2002 | Cooke et al. | |
| 2002/0095430 A1 | 7/2002 | Egilsson et al. | |
| 2003/0088602 A1* | 5/2003 | Dutta et al. | 708/700 |
| 2004/0216072 A1 | 10/2004 | Alpert et al. | |
| 2005/0147081 A1 | 7/2005 | Acharya et al. | |
| 2006/0031615 A1* | 2/2006 | Bruce et al. | 710/240 |
| 2006/0161875 A1 | 7/2006 | Rhee | |
| 2007/0118320 A1 | 5/2007 | Luo et al. | |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2008/0072182 A1 | 3/2008 | He et al. | |
| 2008/0120129 A1 | 5/2008 | Seubert et al. | |
| 2009/0070726 A1 | 3/2009 | Mehrotra et al. | |
| 2009/0231348 A1* | 9/2009 | Mejdrich et al. | 345/506 |
| 2009/0268677 A1 | 10/2009 | Chou et al. | |
| 2009/0313592 A1 | 12/2009 | Murali et al. | |
| 2010/0040162 A1 | 2/2010 | Suehiro | |
| 2011/0035523 A1 | 2/2011 | Feero et al. | |
| 2011/0060831 A1 | 3/2011 | Ishii et al. | |
| 2011/0072407 A1 | 3/2011 | Keinert et al. | |
| 2011/0154282 A1 | 6/2011 | Chang et al. | |
| 2011/0276937 A1 | 11/2011 | Waller | |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0110541 A1 | 5/2012 | Ge et al. | |
| 2012/0155250 A1 | 6/2012 | Carney et al. | |
| 2012/0209944 A1* | 8/2012 | Mejdrich et al. | 709/213 |
| 2013/0051397 A1 | 2/2013 | Guo et al. | |
| 2013/0080073 A1 | 3/2013 | de Corral | |
| 2013/0103369 A1 | 4/2013 | Huynh et al. | |
| 2013/0117543 A1* | 5/2013 | Venkataramanan et al. | 712/220 |
| 2013/0151215 A1 | 6/2013 | Mustapha | |
| 2013/0159944 A1 | 6/2013 | Uno et al. | |
| 2013/0174113 A1 | 7/2013 | Lecler et al. | |
| 2013/0207801 A1 | 8/2013 | Barnes | |
| 2013/0219148 A1 | 8/2013 | Chen et al. | |
| 2013/0263068 A1 | 10/2013 | Cho et al. | |
| 2013/0326458 A1 | 12/2013 | Kazda et al. | |
| 2014/0068132 A1 | 3/2014 | Philip et al. | |
| 2014/0092740 A1 | 4/2014 | Wang et al. | |
| 2014/0098683 A1 | 4/2014 | Kumar et al. | |
| 2014/0115218 A1 | 4/2014 | Philip et al. | |
| 2014/0115298 A1 | 4/2014 | Philip et al. | |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71(5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

AUTOMATIC PIPELINING OF NOC CHANNELS TO MEET TIMING AND/OR PERFORMANCE

BACKGROUND

1. Technical Field

Methods and example implementations described herein are directed to interconnect architecture, and more specifically, automatically generating a Network on Chip (NoC) with pipelining solutions for the interconnects.

2. Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a wormlike image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multilayer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multilayer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is certain amount of heterogeneity (e.g., certain hosts talk to each other more frequently than the others), the interconnect performance may depend a lot on the NoC topology and where various hosts are placed in the topology with respect to each other and to what routers they are connected to. For example, if two hosts talk to each other frequently and need higher bandwidth, they should be placed next to each other. This will reduce the latency for this communication, and thereby reduce the global average latency, as well as reduce the number of router nodes and links over which the high bandwidth of this communication must be provisioned. Moving two hosts closer to one another may make certain other hosts far apart since all hosts must fit into the 2D planar NoC topology without overlapping with each other. Thus, tradeoffs must be made and the hosts must be placed after examining the pair-wise bandwidth and latency requirements between all hosts so that certain global cost and performance metrics is optimized. The cost and performance metrics can include the average structural latency between all communicating hosts in number of router hops, or the sum of the bandwidth between all pair of hosts and the distance between them in number of hops, or some combination thereof. This optimization problem is known to be non-deterministic polynomial-time hard (NP-hard) and heuristic based approaches are often used. The hosts in a system may vary is shape and sizes with respect to each other which puts additional complexity in placing them in a 2D planar NoC topology, packing them optimally leaving little whitespaces, and avoiding overlapping hosts.

One aspect of optimization of traffic profiles includes placement of pipeline stages as illustrated in FIG. 4. In a point to point example illustrated in FIG. 4, there are two routers R1

402 and R2 404 with input and output channels such as 406-1 and 406-2 between them. Each channel 406 can be configured to transmit data through 412-1 (from Router 1 to Router 2 using 406-1) and through 412-2 (from Router 2 to Router 1 using 406-2), which in turn is accompanied by a credit signal that flows in the opposition direction to the transmitted data (or control). Such credit signal is shown as 414-1 for channel 406-1 and 414-2 for channel 406-2. Each router 402/404 contains a clock, one or more buffers, and an internal flip flop for data management. Data transmitting router can further include a registering stage shown as 416-1 when data is transmitted from Router 1 to Router 2, and 416-2 when data is transmitted from Router 2 to Router 1. Furthermore, receiving router can include a FIFO shown as 418-1 when data is received by Router 2 from Router 1, and 418-2 when data is received by Router 1 from Router 2. To control timing or meet performance requirements, channels 406 between the routers 402/404 may employ one or more pipeline stages such as 408-1 and 408-2, collectively referred to as pipeline stages 408 hereinafter, within the channels 406. Pipeline stages 408 can include hardware elements such as flip-flops (e.g., JK, data/delay, etc.) to control the traffic flow. One or more pipeline stages 408 can be used as output registers such as 410-1 and 410-2, collectively referred to as output registers 410 hereinafter, which are employed at output channel of each router 402/404 to control traffic flow. A given router 402/404 may employ a single buffer for handling all traffic through the router, or can also employ a buffer for each input/output pair of channels managed by the router. Further, as the traffic flows through each of the pipeline stages 406, the traffic can be controlled to meet timing and or performance requirements based on flip-flop implemented at the pipeline stage. Pipeline stages 406 can further be configured to manage routing computation (RC), virtual channel allocation (VA), switch allocation (SA), switch traversal (ST) before it is delivered to the appropriate output port.

In the related art, there is no automated solution for placement of pipeline stages, and system designers may utilize the pipeline stages in a suboptimal manner when building a NoC. Further, as complexity of NoC increases, difficulty of determining placement and utilization of pipeline stages also increases.

SUMMARY

The present application is directed to generating a Network on Chip (NoC) comprising a plurality of channels and a plurality of routers, wherein the NoC can be configured with one or more pipeline stages that are positioned at one or more of the plurality of channels in the NoC based on an associated system on chip (SoC) floorplan and a NoC topology.

Aspects of the present application may include a method, which involves, configuring one or more pipeline stages on a plurality of output channels coupled with multiple routers based on several parameters including but not limited to distance between routers (e.g., for a point to point transaction), length of channels, clock frequency, wire delay (e.g., mm/clock cycle), and timing path within routers themselves. Such implementation of pipeline stages differs for each router or combination of routers as routers may have different timing (as they have a separate clock, buffer, and flip-flop for managing traffic through the router), which therefore may necessitate varying configurations of pipeline stages. Parameters for defining the pipeline stages can be provided in the specification for generating NoC, or can be derived from NoC topology and SoC floorplan, depending on desired implementation. Implemented pipeline stages can then be used to control timing or meet performance requirements.

Aspect of present application may include a computer readable storage medium storing instructions for executing a process. The instructions may involve, configuration of one or more pipeline stages on a plurality of output channels coupled with multiple routers based on several parameters including but not limited to distance between routers (e.g., for a point to point transaction), length of channels, clock frequency, wire delay (e.g., mm/clock cycle), and timing path within routers themselves.

Aspects of present application may include a method, which involves, for a network on chip (NoC) configuration, including a plurality of cores interconnected by a plurality of routers in a heterogeneous or heterogeneous mesh, ring, or torus arrangement, configuring one or more pipeline stages on a plurality of output channels coupled with multiple routers based on several parameters including but not limited to distance between routers (e.g., for a point to point transaction), length of channels, clock frequency, wire delay (e.g., mm/clock cycle), and timing path within routers themselves.

Aspects of the present application may include a system, which involves, a router and channel detail extraction module, a pipeline parameter selection module, and a pipeline stage implementation module. The router and channel detail extraction module can be configured to retrieve details of router and respective output channel at which pipeline stages are to be implemented. Such details can, in one example, be extracted from specification of the NoC interconnect. Pipeline parameter selection module can be configured to identify parameters to be incorporated for computing the number of pipeline stages that need to be implemented on the output channel in context. Such parameters can include, but are not limited to, length of output channel, wire delay, and output registers, clock frequency, and number of clock cycles at one or both of the source and destination routers. Pipeline stage implementation module can be configured to incorporate one or more of the parameters identified by the pipeline parameter selection module and compute the number of pipeline stages required on the output channel in context based on the incorporated parameters. Number of pipeline stages identified by the pipeline stage implementation module can then be incorporated suitably on the concerned output channel.

BRIEF DESCRIPTION OF THE DRAWINGS

FIG. 2(*b*) illustrates three different routes between a source and destination nodes.

FIG. 3(*b*) illustrates the related art bridge logic between host and multiple NoC layers.

FIG. 5(*b*) illustrates a flow diagram for identifying number of pipeline stages required for an output channel in accordance with an example implementation.

DETAILED DESCRIPTION

Figure 1A:
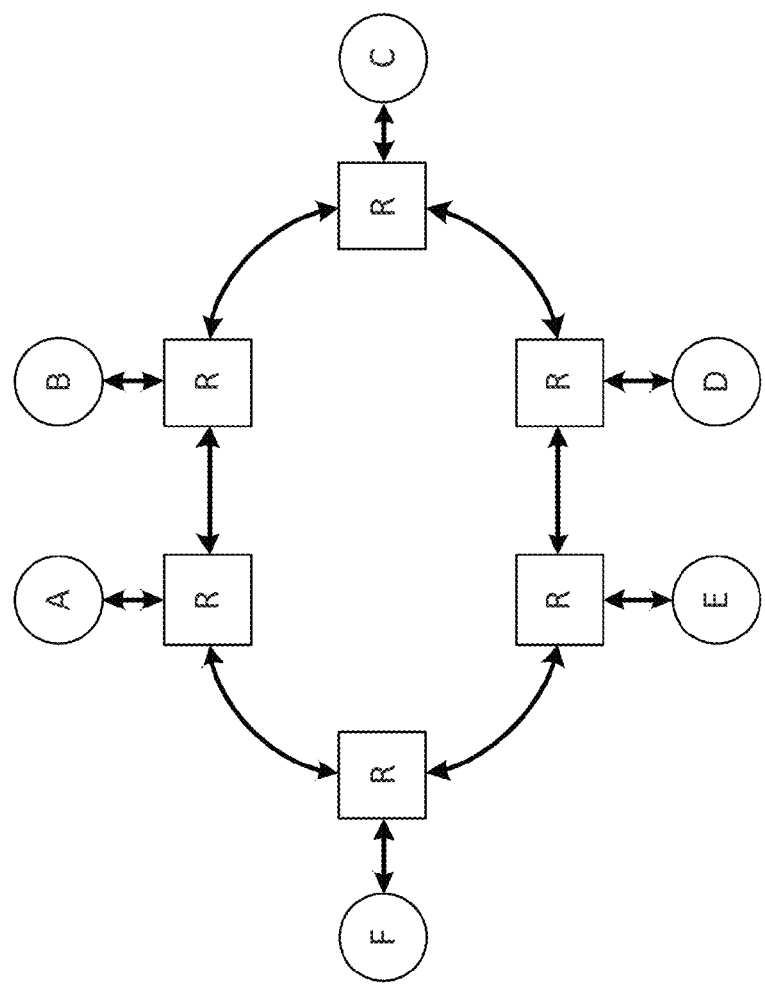
FIGS. 1(*a*), 1(*b*) 1(*c*) and 1(*d*) illustrate examples of Bidirectional ring, 2D Mesh, 2D Torus, and 3D Mesh NoC Topologies.
Figure 1B:
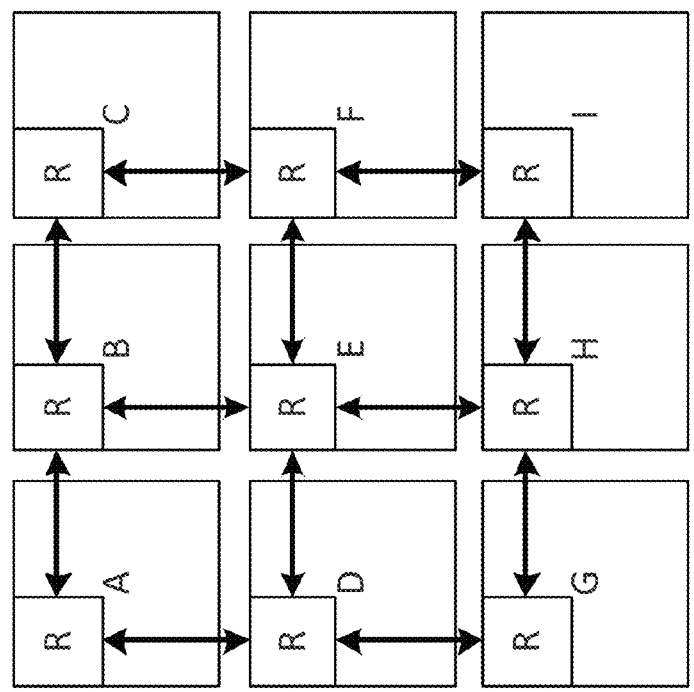
Figure 1C:
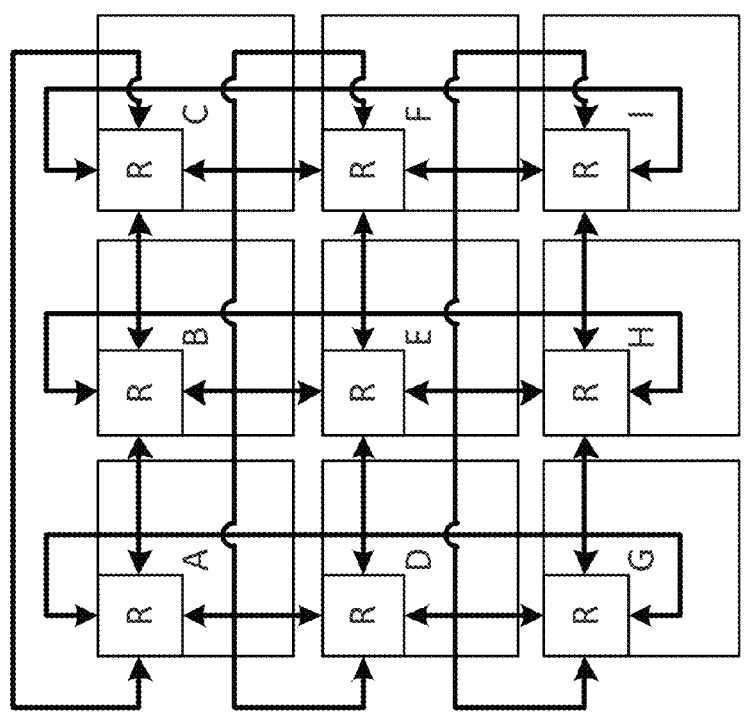
Figure 1D:
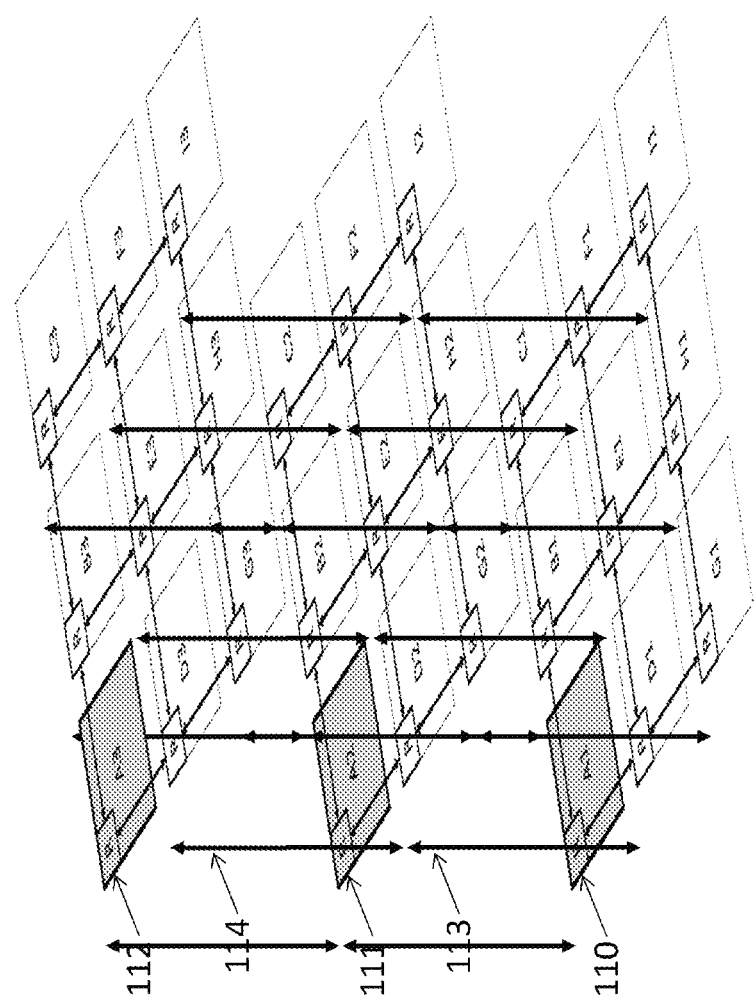
Figure 2A:
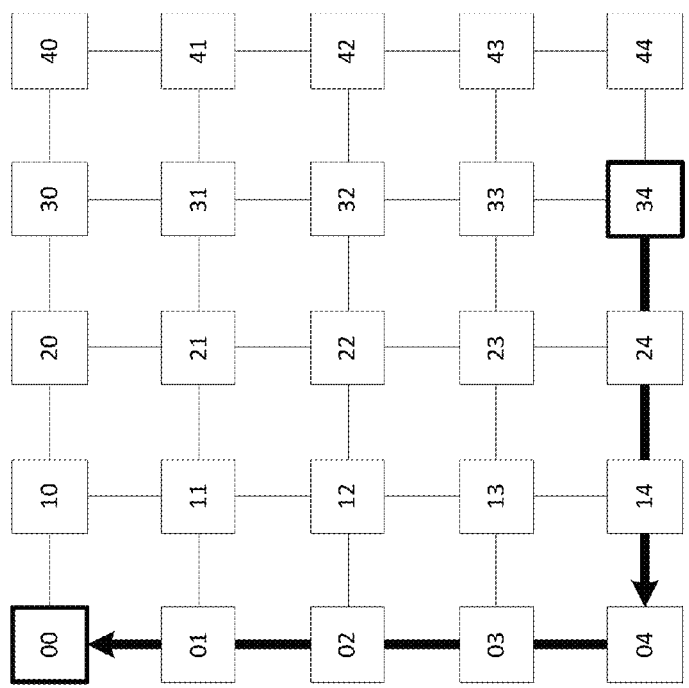
FIG. 2(*a*) illustrates an example of XY routing in a related art two dimensional mesh.
Figure 2B:
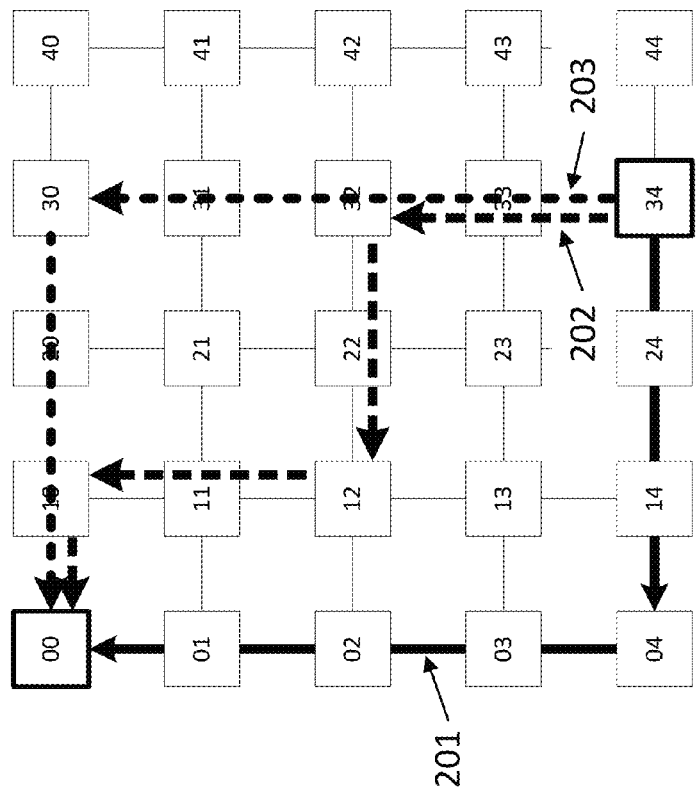
Figure 3A:
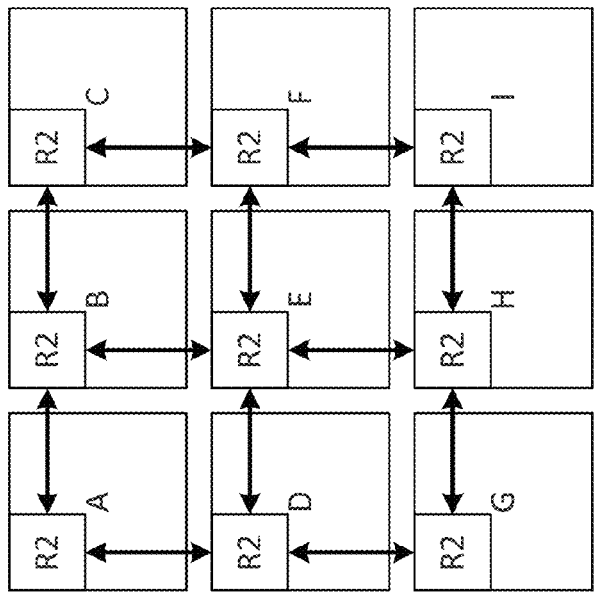
FIG. 3(*a*) illustrates an example of a related art two layer NoC interconnect.
Figure 3A:
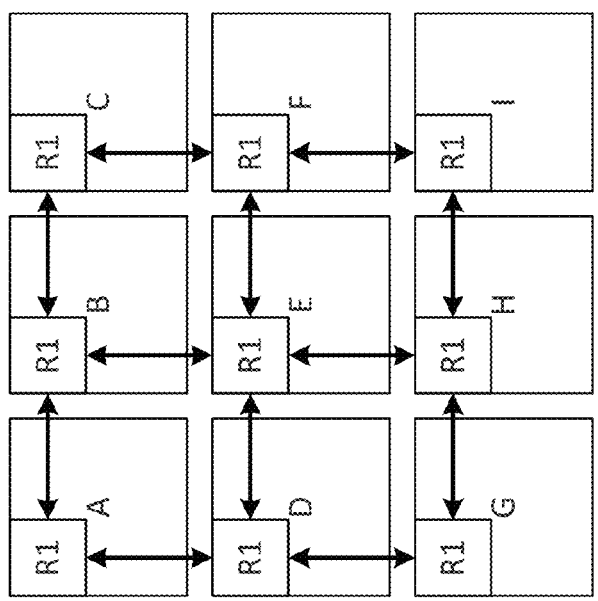
Figure 3B:
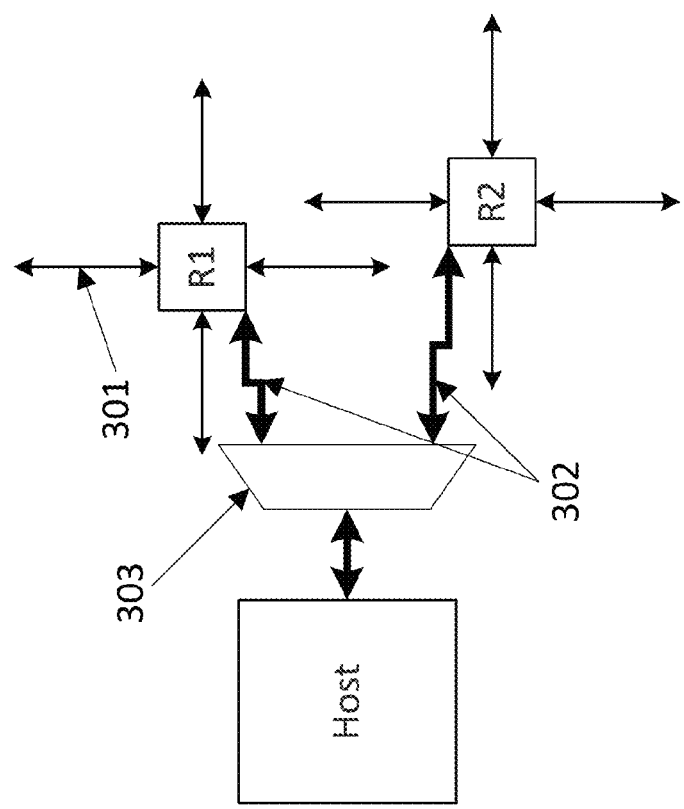
Figure 4:
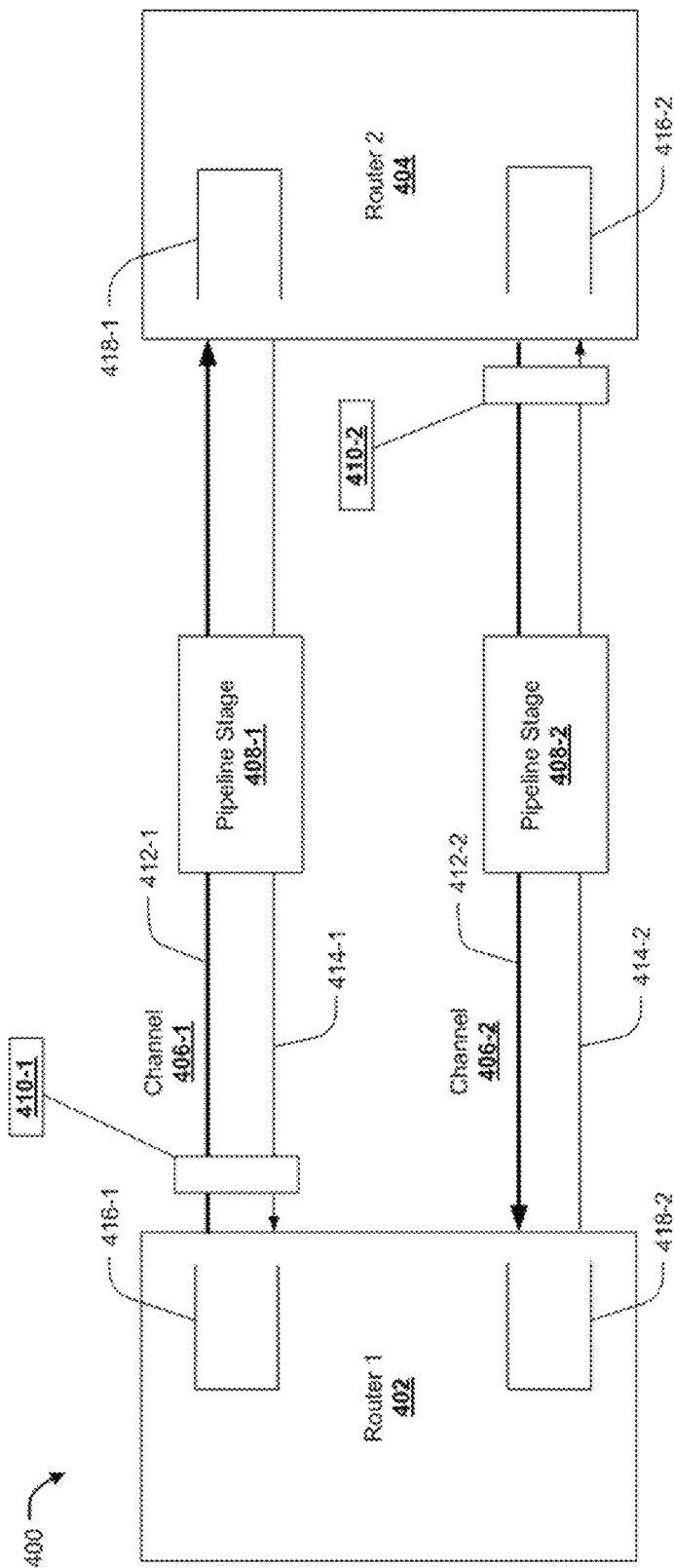
FIG. 4 illustrates an example of pipelining between two routers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In example implementations, a NoC including a plurality of routers and channels can automatically be generated. During such generation, the NoC can be configured with one or more pipeline stages that are positioned at one or more of a plurality of channels in the NoC based on an associated system on chip (SoC) floorplan and a NoC topology. Such pipeline stages can be utilized based on decisions to implement output registers for output channels, number of pipelines for a given point-to-point transmission, and distances and position of the pipeline stages on the channel, among other like parameters. Router pipeline stages can also be configured to undertake functions including but not limited to routing computation (RC), virtual channel allocation (VA), switch allocation (SA), switch traversal (ST) before packets/message is delivered to an appropriate output port. Further, one or more buffers of each router in the NoC may be configured based on utilization of pipeline stages. Such configuration can involve updating the specification or register transfer level (RTL), or can be done during generation of the NoC.

In one aspect of the present application, Network on Chip (NoC) interconnect architecture can be generated by configuring a plurality of channels, a plurality of routers, and one or more pipeline stages that are positioned at one or more of the plurality of channels in the NoC based on an associated system on chip (SoC) floorplan and a NoC topology. Specification, parameters, and bandwidth, latency, and QoS requirements of a NoC plays a crucial role in determining the number of output registers required to be implemented on output channels, number of pipeline stages required, and the positions where the identified number pipeline stages are to be positioned.

In one aspect of the present application, output channels, also referred to as channels or "plurality of channels" hereinafter can be configured to implement and incorporate one or more output registers operatively coupled with one or more corresponding routers or handling output of the channels based on setup time of corresponding router(s) and timing path within the corresponding router(s).

In another aspect of the present application, number of pipeline stages required for output channels in a given NoC can be determined based on one or a combination of parameters such as channel length, wire delay, output registers, clock consumption, and clock frequency between a pair of routers associated with the concerned channel(s). Based on the computed number of pipeline stages, pipelines can be generated and implemented in the concerned set of channels. In one aspect of the application, implemented pipeline stages can be configured to such that they are utilized as a buffer supplement, based on which internal buffers of one or more concerned set of routers can be adjusted. In one aspect of the application, each pipeline stage can have different components, characteristics, attributes, and parameters that enable customization of the kind of performance and functionality expected from pipeline stages. For instance, to eliminate, handle, or reduce backpressure situations between routers, one or more flip flops, relay stations, clocked repeaters of unit latency, two-fold storage capacity, among other components can be incorporates as part of one or more pipeline stages.

In example implementations, configuration and use of pipeline stages can be based on several parameters. Such parameters can include, but are not limited to, distance between routers (e.g., for a point to point transaction), length of channels, clock frequency, wire delay (e.g., mm/clock cycle), and timing path within routers themselves. Routers may have different timing as each router may have a separate clock, buffer, and flip-flop for managing traffic through the router, which therefore may necessitate varying configurations of pipeline stages. Parameters can be provided in the specification for generating NoC, or can be derived from NoC topology and SoC floorplan, depending on desired implementation.

In an example implementation, routers in generated NoC can be associated with one or more output registers at the output channels of the routers. Use of an output register at the routers may be based on setup time and hold time of one or more flip flops within the router. Further, each router may be allocated a certain amount of clock based on the timing path in a point to point transaction with another router. In an example implementation, an output register can be placed at the output channel of a router when the sum of the clock consumed by the router and the set up time is at least one clock cycle. For example, for an output channel of a router in a point to point connection utilizing the output channel, clock consumption of the router is "x" such that x<1 clock cycle, as the clock is shared with another router in the point to point transaction. If "x+router setup time" is at least one clock cycle, then an output register can be placed for that output channel of the router. Such evaluations can be made for each output channel for each router in the NoC. Other implementations are also possible, and the present application is not limited to this example implementation. For example, the use of the output register at the routers can be indicated by the NoC specification, depending on the desired implementation.

In another example implementation, requirement identification and positioning of output registers can also be configured based on one or a combination of number of combinatorial logic stages in a given router's last internal register from which signals are sent out, output signals, hold time, setup time, wire delay with router, skew, and wireloads, among other parameters. In an example, in case time through the last combinatorial logic stage in router+setup time+skew+wire delay is around 1, output register(s) can be incorporated on output channel. In another example, in case time through the last combinatorial logic stage in router+setup time+skew+wire delay is greater than 1, more pipelining may be needed within the router design as well in output register(s). On similar lines, wireloads can also be used, independently or collectively with other attributes, to determine positioning of output register(s).

Each output channel of one or more routers in a NoC can be evaluated to determine the number of pipeline stages that should be placed at the output channel, if at all the pipeline stages are needed. In one aspect of the application, number of pipeline stages that are utilized can be based on length of output channel, wire delay, and output registers. In example implementations, number of pipeline stages can be determined for a given output channel based on wire delay and length of the channel. For example, given a channel length "L" and wire delay "W", one way to estimate the number of pipeline stages used for the channel can be based on the ratio of L and W (e.g., L/W). Number of pipeline stages can be determined as the ratio rounded up to the nearest number, or can also incorporate clock consumption between the routers in a point to point situation. Using such a ratio, pipelining can be implemented so as to reduce the cycle-time created by wire delay by inserting, say a buffer, between the sender and the receiver. For example, suppose for a given output channel, output router consumes a clock of "x", and corresponding input router has a clock of "y". Thus, x+y is the amount of clock cycles spent at the input and the output of the router. The number of pipeline stages can be configured based on additional consumed clock cycles as (L/W)+x+y, which figure can then be rounded up. Other implementations are also possible, depending on the desired implementation. For example, output register can also be counted as a pipeline stage, and the number of pipeline stages for an output channel can be decremented by one from use of the output register. Pipeline stage can further include synchronous pipeline buffer comprising a bank of latches, flip flops, and/or a handshake controller.

In one aspect of the application, once the number of pipeline stages is determined for a given output channel, positioning of the pipeline stages can be determined based on one or more parameters. In an example implementation, placement of pipeline stages can be configured based on wire delay, clock of output channel, clock frequency, setup time of flip-flops, and hold time of flip flops, clock skew, and wireloads. In an example, let "w"' be the distance between each flip-flop along an output channel. In such a case, one example can be w'=w[1−f (setup time+hold time)], wherein w is the wire delay, f is clock frequency. In the above example, pipeline stages can be spaced from each other at a distance of w' for each flip-flop. One may also incorporate time consumed in output combinatorial logic at transmitting router if output registering is not used to determine spacing between the transmitting router and the first pipeline stage on the channel. For instance, if x is the portion of clock spent in transmitting combinatorial logic, spacing "w''" between router and first pipeline stage can be computed as w'*(1−x). Similarly, based on combinatorial logic between input channel signals at receiving router and first register stage in the receiving router, distance between the last pipeline stage and the receiving router may be determined. If y is the portion of clock spent in receiving combinatorial logic, spacing "w'''", which is the distance between the receiving router and the channel's last pipeline stage can be computed as w'*(1−y).

Figure 5A:
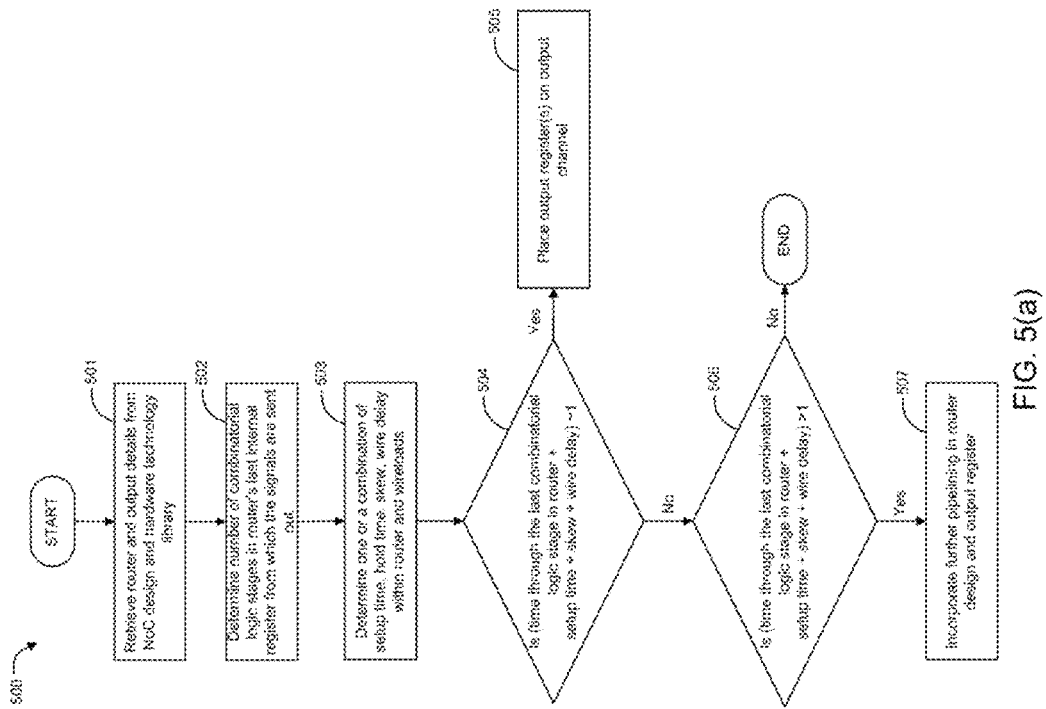
FIG. 5(*a*) illustrates a flow diagram for positioning output register(s) on output channels in accordance with an example implementation.

FIG. 5(a) illustrates an example flow diagram 500 for output register implementation, in accordance with an example implementation. The flow begins at 501, where details of router and respective output channel are retrieved from NoC design and hardware technology library. Although the present disclosure has been explained with reference to one router (input or output) and one output channel, the same is only for simplicity of the description, and the method can be conducted for any number of routers and channels corresponding thereto.

At 502, number of combinatorial logic states in router's last internal register from which signals are sent out are determined. At 503, the method is configured to determine one or a combination of setup time, hold time, skew, wire delay within router, and wireloads, among other like parameters. At 504, it is evaluated as to whether the sum of time through the last combinatorial logic stage in router+setup time+skew+wire delay is around 1, wherein, at 505, in case the sum is around 1, one or more output register(s) can be incorporated and implemented onto the output channel. At 506, in case the sum is greater than 1, further pipelining may be needed within the router design as well in the output register(s).

Figure 5B:
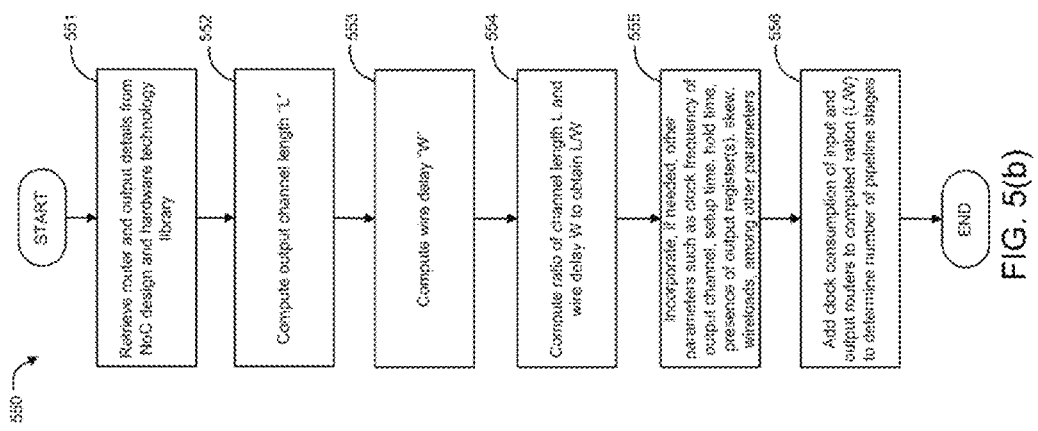

FIG. 5(b) illustrates an example flow diagram 550 for computation of the number of pipeline stages to be implemented, in accordance with an example implementation. The flow begins at 551, where details of router and respective output channel are retrieved from NoC design and hardware technology library. Although, the number of pipeline stages to be implemented are based on a number of parameters including, but not limited to, length of output channel, wire delay, clock frequency, router clock consumption, and output registers, among other parameters, the present exemplary method incorporates wire delay, channel length, and clock consumption for determining the number of pipeline stages to be implemented.

At 552, length "L" of output channel under consideration is computed. At 553, wire delay "W" is computed. At 554, a ratio is computed between channel length and wire delay to obtain L/W. The ratio value can be rounded off, either at this stage or subsequently once the total number of stages has been computed. At 555, any other parameter(s) such as clock frequency of output channel, setup time, hold time, presence of output register(s), skew, and wireloads, among others can be incorporated. At 556, clock consumption of input and output routers corresponding to output channel in context can be evaluated and added to the ratio L/W to determine the total number of pipeline stages that are required to be implemented on the output channel. If required, the number of pipeline stages can be rounded off.

Figure 6:
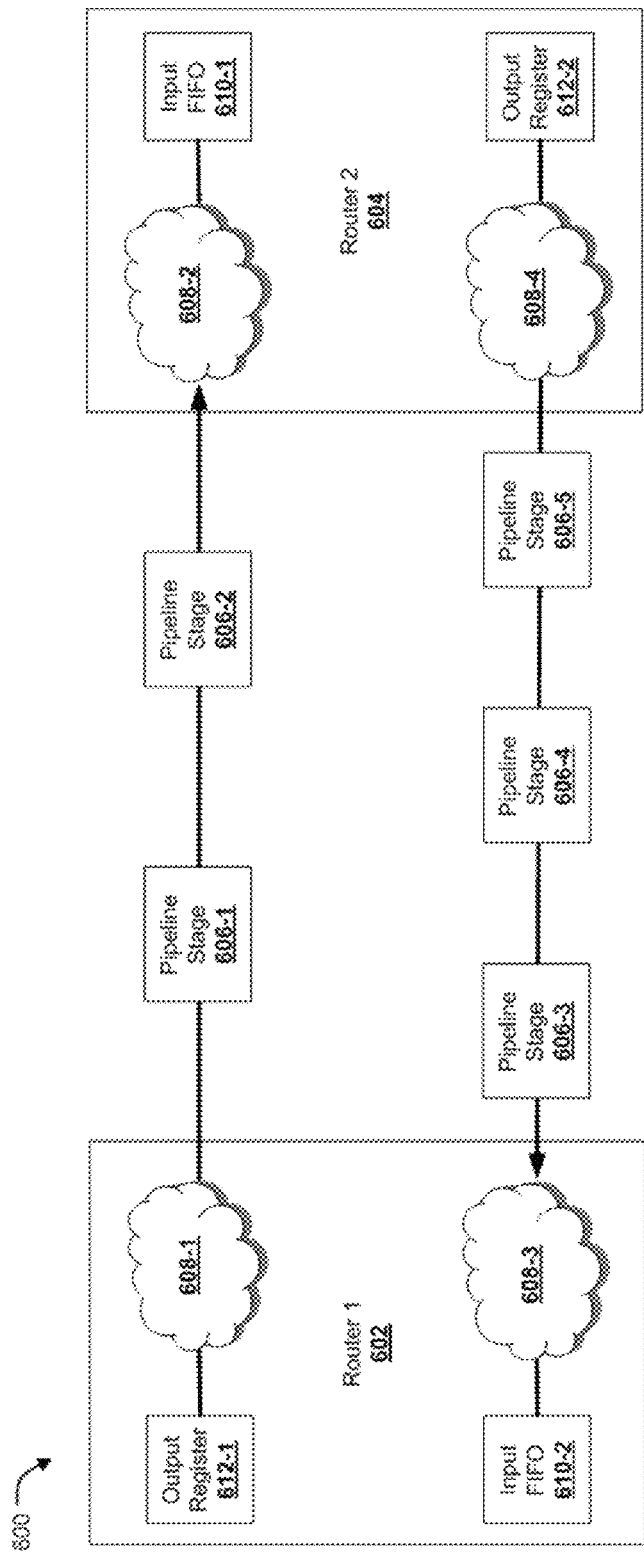
FIG. 6 illustrates an example of buffer adjustments for routers based on the pipeline stages in accordance with an example implementation.

In example implementations, buffer of each router can be changed based on the number of pipeline stages at each input and output connect. Buffer can be extended to accommodate latency requirements. FIG. 6 illustrates an example 600 of buffer adjustment based on pipeline stages in accordance with an example implementation. Buffers of the routers 602 and 604 can operate on a credit system as described, for example, in U.S. patent application Ser. No. 13/886,794 (NET013), herein incorporated by reference in its entirety for all purposes. When a credit system is employed, buffer latency may need to be adjusted based on use of pipeline stages 606-1, 606-2, 606-3, 606-4, and 606-5, collectively referred to as 606 hereinafter. In the example of FIG. 6, there are five pipeline stages 606 placed between routers 602 and 604 in a point-to-point connection. When data is transmitted per clock cycle, each pipeline stage 606 may operate on the data, which may affect when each buffer receives the data. The buffer may therefore be configured to increase buffer size B by five data flits (i.e. B=B+5) to increase latency by five cycles for the five pipeline stages that are included. FIG. 6, in another example, further illustrates an optional output register at the transmission Tx side of a router and an input FIFO at the receiving Rx side of the router. As can be seen, an optional output register 612-1 can be configured at the Tx side of Router 1 and an optional output register 612-2 can also be configured at the Tx side of Router 2. Similarly, input FIFO 610-1 is configured at the Rx side of Router 2 and input FIFO 610-2 is configured at the Rx side of Router 1. In another example, a combinatorial cloud 608-1, 608-2, 608-3, 608-4, collectively referred to as cloud 608 hereinafter, can be configured at the Tx and the Rx sides of one or more Routers such that the clouds 608 can operatively couple output/inputs signals with output register/input FIFO of the routers. For example, cloud 608-1 connects output register 612-1 of Router 1 with output signal from the Router 1. Similarly, cloud 608-2 connects input FIFO 610-1 of Router 2 with input signal from the Router 1. In an example implementation, combinatorial number of logic stages in a given cloud 608 are important to determine the output register 612 as well as the pipeline stages 606. For example, if the Tx cloud (608-1 or 608-4) takes close to ~1 cycle, output register 612 is needed. If output register 612 is decided to be used, the Tx cloud time is not used in pipeline stage computation, else it is used in pipeline stage computation, wherein the more the time it takes through the Tx cloud, the more likely is the need for additional pipeline stages 606. It should be noted that the time through a Tx cloud must be <1, without which the router design needs to be changed as it cannot operate at clock frequency. The Rx cloud (608-2 or 608-3) must take <1 cycle as well, and this value can be used to determine the number of pipeline stages 606 on the channels.

In another example of FIG. 6, there may be a throughput requirement between the two routers 602 and 604. For example, suppose a first router 602 consumes "x" clock per data and the second router 604 consumes "y" clock per data. In case the total clock consumed (x+y) is less than one cycle, the buffer can be configured to increase buffer size B based on number of pipeline stages 606 and clocks consumed to meet throughput requirement of x+y. In one example, a new buffer size B' can be computed as B'=B+(number of pipeline stages/(x+y)). Therefore, in the example 600 of FIG. 6, if the clock consumed by two routers 602 and 604 is half a cycle, the buffer size can be increased by 5/2 data flits (i.e. B=B+(5/2)). Other implementations are also possible and the present disclosure is not limited by these examples. Depending on the desired implementation, buffer size can be modified based on throughput requirements as defined in the specification, as well as flow control signal credits. In another example implementation, pipeline stages 606 may be utilized as additional input buffers for the communication between routers 602 and 604. In such an implementation, buffer at the routers 602 and 604 may not need to be fully extended to cover the round trip time between the routers, as each of pipeline stage 606 may act as a single buffer stage. Thus, the total input buffer requirement at receiving end of a channel will be reduced. In FIG. 6, at the channel from Router 1 to Router 2, two pipeline stages 606-1 and 601-2 may be used as two additional input buffer stages, and therefore the input buffer requirements at Router 604 for this channel may be reduced by up to 2. Similarly, input buffer requirement at Router 602 for the channel from router 604 to router 602 may be reduced by up to 3.

Figure 7:
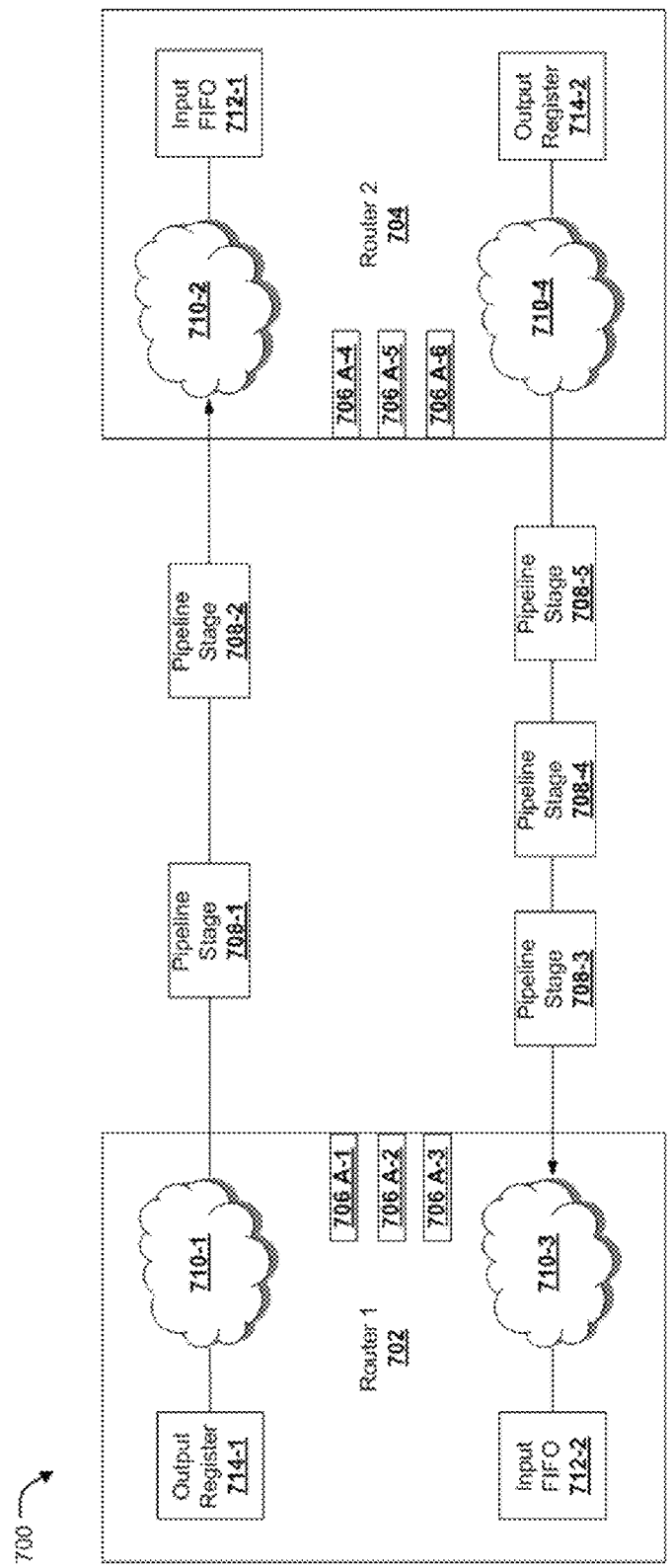
FIG. 7 illustrates an example of the use of virtual channels based on the pipeline stages, in accordance with an example implementation.

FIG. 7 illustrates an example 700 of use of virtual channels based on pipeline stages 708, in accordance with an example implementation. Buffer of each router 702 and 704 may be allocated among virtual channels 706-1, 706-2, and 706-3 for router 702 and 706-4, 706-5, and 706-6 for router 704 based on throughput requirements of the virtual channels, collectively referred to 706 hereinafter. Example 700 further illustrates output registers and input FIFO's being configured for one or more of the routers 702 and 704, wherein output registers 714-1 and 714-2 are configured at Tx sides of the routers and input FIFO's 712-1 and 712-2 are configured on the Rx sides of the routers. Furthermore, the input/output signals can be operatively coupled with the router's registers/FIFO by means of a plurality of computational clouds 710-1, 710-2, 710-3, and 710-4, collectively referred to as 710 hereinafter, such that time through each cloud 710 must be <1 cycle, without which the routers cannot operate at the desired clock frequency and would need to change their design. In the example 700 of FIG. 7, there are three virtual channels 706 for each of the illustrated pair of routers 702/704 to facilitate point-to-point communication between the two routers. If virtual channels 706 have equal throughput, buffer can be divided equally between each of the virtual channels 706. However, one should appreciate that virtual channels 706 may also have unequal throughput requirements and any such change in buffer allocation amongst virtual channels 706 is completely within the scope of the present application. Implementation of buffer allocation can be based on an increase of buffer as illustrated in FIG. 6. Buffer allocation for each of the virtual channels 706 can be allocated proportionally based on throughput requirements of each of the virtual channels 706. Based on throughput requirements of the virtual channels 706, size of one or more virtual channels 706 associated with routers 702 and 704 can be also assessed and defined.

Figure 8:
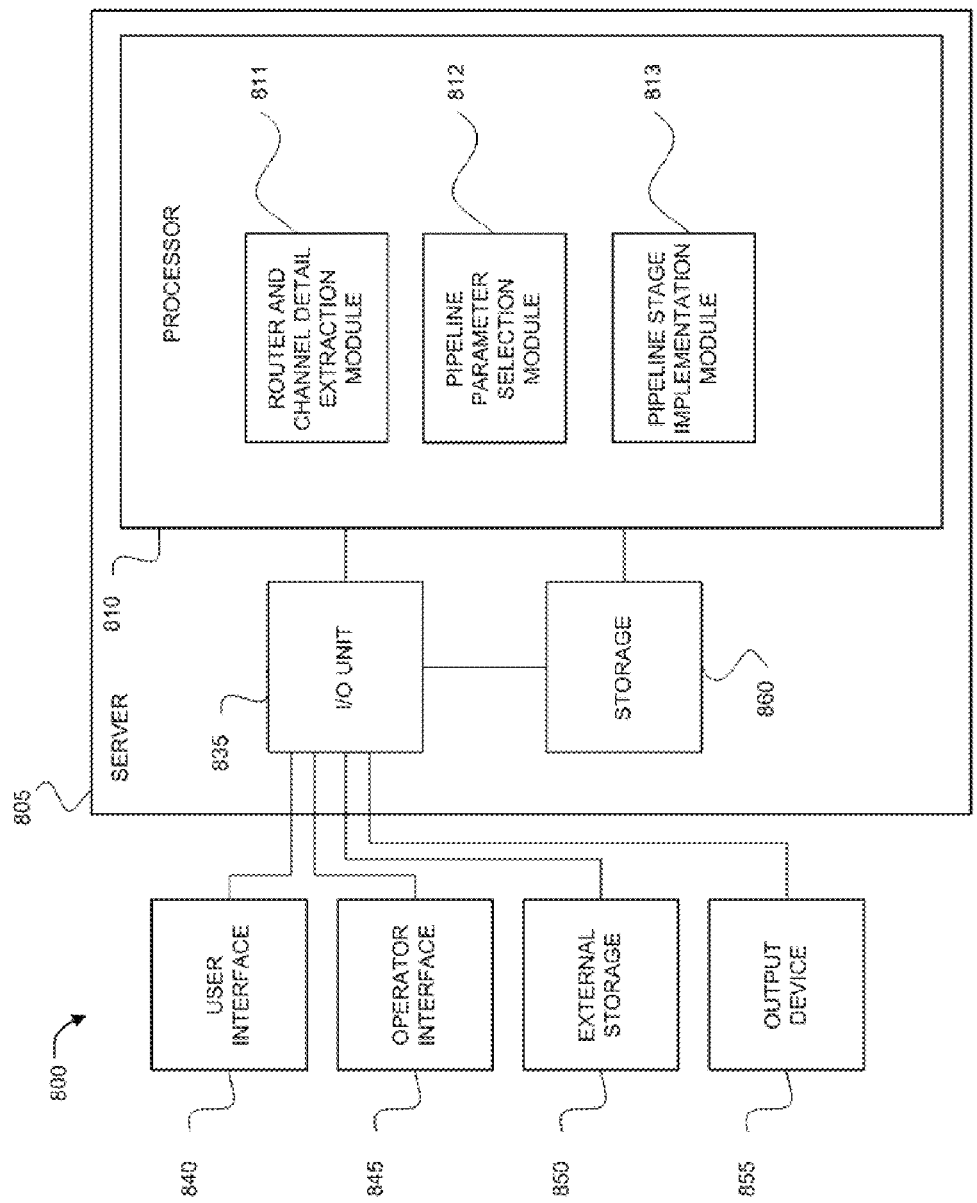
FIG. 8 illustrates a computer/server block diagram upon which the example implementations described herein may be implemented.

FIG. 8 illustrates an example computer system 800 on which example implementations may be implemented. The computer system 800 includes a server 805 which may involve an I/O unit 835, storage 860, and a processor 810 operable to execute one or more units as known to one of skill in the art. The term "computer-readable medium" as used herein refers to any medium that participates in providing instructions to processor 810 for execution, which may come in the form of computer readable storage mediums, such as, but not limited to optical disks, magnetic disks, read-only memories, random access memories, solid state devices and drives, or any other types of tangible media suitable for storing electronic information, or computer readable signal mediums, which can include media such as carrier waves. The I/O unit processes input from user interfaces 840 and operator interfaces 845 which may utilize input devices such as a keyboard, mouse, touch device, or verbal command.

The server 805 may also be connected to an external storage 850, which can contain removable storage such as a portable hard drive, optical media (CD or DVD), disk media or any other medium from which a computer can read executable code. The server may also be connected an output device 855, such as a display to output data and other information to a user, as well as request additional information from a user. The connections from the server 805 to the user interface 840, the operator interface 845, the external storage 850, and the output device 855 may via wireless protocols, such as the 802.11 standards, Bluetooth® or cellular protocols, or via physical transmission media, such as cables or fiber optics. The output device 855 may therefore further act as an input device for interacting with a user.

The processor 810 may execute one or more modules. System 800 can include a router and channel detail extraction module 811, a pipeline parameter selection module 812, and a pipeline stage implementation module 813. The router and channel detail extraction module 811 can be configured to retrieve details of router and respective output channel at which pipeline stages are to be implemented. Such details can be extracted from specification of the NoC interconnect. Pipeline parameter selection module 812 can be configured to identify parameters to be incorporated for computing the number of pipeline stages that need to be implemented on the output channel in context. Such parameters can include, but are not limited to, length of output channel, wire delay, and output registers, clock frequency, and number of clock cycles at one or both of the source and destination routers. Pipeline stage implementation module 813 can be configured to incorporate one or more of the parameters identified by the Pipeline parameter selection module 812 and compute the number of pipeline stages required on the output channel in context based on the incorporated parameters. For instance, given a channel length "L" and wire delay "W", one way to estimate the number of pipeline stages used for the channel can be based on the ratio of L and W (e.g., L/W). Number of pipeline stages can be determined as the ratio rounded up to the nearest number, or can also incorporate clock consumption between the routers in a point to point situation. For example, suppose for a given output channel, output router consumes a clock of "x", and corresponding input router has a clock of "y". Thus, x+y is the amount of clock cycles spent at the input and the output of the router. The number of pipeline stages can be configured based on additional consumed clock cycles as (L/W)+x+y, which figure can then be rounded up. Number of pipeline stages identified by the pipeline stage implementation module 813 can then be incorporated suitably on the concerned output channel.

In some example implementations, the computer system 800 can be implemented in a computing environment such as a cloud. Such a computing environment can include the computer system 800 being implemented as or communicatively connected to one or more other devices by a network and also connected to one or more storage devices. Such devices can include movable user equipment (UE) (e.g., smartphones, devices in vehicles and other machines, devices carried by humans and animals, and the like), mobile devices (e.g., tablets, notebooks, laptops, personal computers, portable televisions, radios, and the like), and devices designed for stationary use (e.g., desktop computers, other computers, information kiosks, televisions with one or more processors embedded therein and/or coupled thereto, radios, and the like).

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method, comprising:
   generating a Network on Chip (NoC) comprising a plurality of channels and a plurality of routers, the NoC configured with one or more pipeline stages that are positioned at one or more of the plurality of channels in the NoC based on an associated system on chip (SoC) floorplan and a NoC topology;
   for each of the plurality of channels in the NoC, generating an output register for a corresponding one of the plurality of routers handling output for the each of the one or more channels in the NoC based on a setup time of the corresponding router and a timing path within the corresponding router; and
   configuring a physical SoC with the generated NoC and generated output registers.

2. The method of claim 1, further comprising:
   determining a number of the one or more pipeline stages for each of the plurality of channels in the NoC based on a clock frequency between a pair of the plurality of routers associated with the each of the one or more channels and a length of the each of the one or more channels, and
   generating the one or more pipeline stages for the each of the plurality of channels based on the number determined by the determining.

3. The method of claim 2, further comprising positioning each of the generated one or more pipeline stages for the each of the plurality of channels based on a wire delay of the each of the plurality of channels.

4. The method of claim 2, further comprising adjusting a buffer at each of the plurality of routers based on the number of the one or more pipeline stages between a pairing of the each of the plurality of routers with an adjacent one of the plurality of routers.

5. The method of claim 4, wherein adjusting the buffer at each of the plurality of routers is further based on a throughput requirement between the pairing of the each of the plurality of routers with the adjacent one of the plurality of routers.

6. The method of claim 5, further comprising sizing one or more virtual channels associated with the each of the plurality of routers based on the throughput requirement.

7. The method of claim 4, wherein each of the one or more pipeline stages is configured to be utilized as a buffer supplement, and wherein the adjusting the buffer at each of the plurality of routers is based on ones of the one or more pipeline stages utilized by the each of the plurality of routers as a buffer supplement.

8. A non-transitory computer readable storage medium storing instructions for executing a process, the instructions comprising:
   generating a Network on Chip (NoC) comprising a plurality of channels and a plurality of routers, the NoC configured with one or more pipeline stages that are positioned at one or more of the plurality of channels in the NoC based on an associated system on chip (SoC) floorplan and a NoC topology;
   for each of the plurality of channels in the NoC, generating an output register for a corresponding one of the plurality of routers handling output for the each of the one or more channels in the NoC based on a setup time of the corresponding router and a timing path within the corresponding router; and
   configuring a physical SoC with the generated NoC and generated output registers.

9. The non-transitory computer readable storage medium of claim 8, wherein the instructions further comprise:
   determining a number of the one or more pipeline stages for each of the plurality of channels in the NoC based on a clock frequency between a pair of the plurality of routers associated with the each of the one or more channels and a length of the each of the one or more channels, and
   generating the one or more pipeline stages for the each of the plurality of channels based on the number.

10. The non-transitory computer readable storage medium of claim 9, wherein the instructions further comprise positioning each of the generated one or more pipeline stages for the each of the plurality of channels based on a wire delay of the each of the plurality of channels.

11. The non-transitory computer readable storage medium of claim 9, wherein the instructions further comprise adjusting a buffer at each of the plurality of routers based on the number of the one or more pipeline stages between a pairing of the each of the plurality of routers with an adjacent one of the plurality of routers.

12. The non-transitory computer readable storage medium of claim 11, wherein adjusting the buffer at each of the plurality of routers is further based on a throughput requirement between the pairing of the each of the plurality of routers with the adjacent one of the plurality of routers.

13. The non-transitory computer readable storage medium of claim 12, wherein the instructions further comprise sizing one or more virtual channels associated with the each of the plurality of routers based on the throughput requirement.

14. The non-transitory computer readable storage medium of claim 11, wherein each of the one or more pipeline stages is configured to be utilized as a buffer supplement, and wherein the adjusting the buffer at each of the plurality of routers is based on ones of the one or more pipeline stages utilized by the each of the plurality of routers as a buffer supplement.

* * * * *